(12) United States Patent
Grassmuck

(10) Patent No.: US 7,040,607 B2
(45) Date of Patent: May 9, 2006

(54) PNEUMATICALLY-CONTROLLED HYDRAULIC VIBRATION-DAMPING SUPPORT

(75) Inventor: Volker Grassmuck, Weinheim (DE)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 11/175,747

(22) Filed: Jul. 6, 2005

(65) Prior Publication Data

US 2006/0006591 A1    Jan. 12, 2006

(30) Foreign Application Priority Data

Jul. 7, 2004    (FR) .................................. 04 07544

(51) Int. Cl.
*F16F 13/00*    (2006.01)

(52) U.S. Cl. ............................. 267/140.14; 267/140.13

(58) Field of Classification Search ................................ 267/140.13–140.15
See application file for complete search history.

(56) References Cited

U.S. PATENT DOCUMENTS

| | | | |
|---|---|---|---|
| 4,383,679 A | 5/1983 | Kakimoto | 267/8 R |
| 4,893,797 A | 1/1990 | Le Fol et al. | 267/140.1 |
| 5,267,726 A | 12/1993 | Takeo et al. | 267/140.14 |
| 6,199,142 B1 | 3/2001 | Saulsbury et al. | 711/118 |
| 6,311,964 B1 * | 11/2001 | Suzuki | 267/140.13 |
| 6,386,527 B1 * | 5/2002 | Oberle | 267/140.14 |
| 6,585,242 B1 * | 7/2003 | Kodama et al. | 267/140.13 |
| 6,592,110 B1 * | 7/2003 | Takashima et al. | 267/140.13 |
| 6,592,111 B1 * | 7/2003 | Nishi et al. | 267/140.13 |
| 6,601,835 B1 | 8/2003 | Genesseaux | 267/140.13 |
| 6,722,641 B1 | 4/2004 | Yamada et al. | 267/140.14 |
| 2001/0026038 A1 | 10/2001 | Muramatsu et al. | 267/140.11 |
| 2002/0149145 A1 | 10/2002 | Genesseaux | 267/140.14 |
| 2004/0070126 A1 * | 4/2004 | Nemoto | 267/140.14 |

FOREIGN PATENT DOCUMENTS

| | | |
|---|---|---|
| EP | 0 298 862 | 7/1988 |
| EP | 0 440 260 | 8/1991 |
| EP | 0 984 193 | 3/2000 |
| EP | 1 176 336 | 1/2002 |
| EP | 1 188 951 | 3/2002 |
| EP | 1 249 636 | 10/2002 |
| JP | 01 229 132 | 9/1989 |

OTHER PUBLICATIONS

Preliminary French Search Report Appl. No.FR0407544, dated Jan. 12, 2005.

* cited by examiner

*Primary Examiner*—Christopher P. Schwartz
(74) *Attorney, Agent, or Firm*—McCracken & Frank LLP

(57) ABSTRACT

A hydraulic vibration-damping support comprising two strength members interconnected by an elastomer body that defines a hydraulic working chamber filled with liquid, which chamber communicates via two passageways with two hydraulic chambers surrounding each other and defined by two juxtaposed pouches formed in a common flexible wall. One of the pouches is surrounded by a pneumatic chamber that can be subjected to suction, and one of the constricted passageways is defined by a tube that projects into said pouch.

14 Claims, 1 Drawing Sheet

US 7,040,607 B2

PNEUMATICALLY-CONTROLLED HYDRAULIC VIBRATION-DAMPING SUPPORT

FIELD OF THE INVENTION

The present invention relates to pneumatically-controlled hydraulic vibration-damping supports.

More particularly, the invention relates to a hydraulic vibration-damping support designed to be interposed for vibration-damping purposes between first and second rigid elements, said vibration-damping support comprising:
- first and second strength members serving to be fastened to the two rigid elements;
- a rigid partition comprising at least one plate;
- an elastomer body which connects the two strength members together and which co-operates with the partition to define a working chamber filled with liquid;
- first and second flexible pouches which co-operate with said rigid partition to define respectively a compensation chamber and an additional hydraulic chamber, which chambers are adjacent and liquid-filled, the compensation chamber being connected to the working chamber via a first constricted passageway filled with liquid and that has a first resonant frequency of less than 20 hertz (Hz), and the additional hydraulic chamber being connected to the working chamber via a second constricted passageway that has a second resonant frequency lying in the range 20 Hz to 80 Hz; and
- a cup co-operating with said partition to define a pneumatic chamber formed around the second pouch.

BACKGROUND OF THE INVENTION

Document EP-A-0 984 193 describes an example of such a hydraulic support, in which the second constricted passageway is formed in the thickness of the above-mentioned plate. When it is desired to obtain said second resonant frequency, that results in said plate having large thickness, and hence large weight, and in the vibration-damping support having relatively large axial size.

OBJECTS AND SUMMARY OF THE INVENTION

A particular object of the invention is to mitigate those drawbacks.

To this end, according to the invention, in a vibration-damping support of the type in question, said plate is secured to a tube that extends inside the second flexible pouch and defines the second constricted passageway.

By means of these provisions, it is not necessary to use a thick plate in order to obtain a second constricted passageway having the desired resonant frequency. This results in a saving in weight and in overall size in the axial direction (i.e. perpendicularly to the above-mentioned plate). In addition, advantageous use is made of the volume of the additional hydraulic chamber by making provision for it to receive the tube that defines the second constricted passageway, thereby further improving the compactness of the support in the axial direction, said tube being surrounded radially by the side wall of the cup, a portion of the second pouch lying between the tube and said side wall.

In preferred embodiments of the invention, it is optionally possible to use one or more of the following provisions:
- the partition further comprises an annular shell that has a groove defining the first constricted passageway and closed by said plate towards the working chamber, the first constricted passageway being disposed radially outside the cup;
- the compensation chamber is disposed, at least in part, radially between the cup and the annular shell;
- the first and second flexible pouches are formed in the same flexible wall, the cup having a side wall that bears against the flexible wall and that locally presses said flexible wall against the rigid partition, thereby separating the compensation chamber from the additional hydraulic chamber;
- the cup presses the flexible wall against the plate around the tube;
- the tube is formed integrally with the plate;
- the tube and the plate are made of plastics material;
- the tube is extended inside the working chamber;
- the tube is extended inside the working chamber by forming a collar in said working chamber, said collar having an axial length that is less than one tenth of the total axial length of the tube;
- the second constricted passageway is mainly disposed inside the cup;
- said plate is plane;
- the cup is formed integrally with a rigid cover that covers said flexible wall;
- the second constricted passageway extends substantially parallel to a central axis that is perpendicular to the plate; and
- the pneumatic chamber is connected to the outside via a vent passageway.

BRIEF DESCRIPTION OF THE DRAWINGS

Other characteristics and advantages of the invention appear from the following description of one embodiment thereof, given by way of non-limiting example and with reference to the accompanying drawings.

In the drawings.

MORE DETAILED DESCRIPTION

In the various figures, like references designate elements that are identical or similar.

Figure 1:
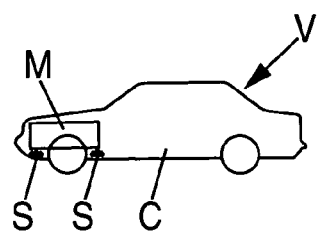
FIG. 1 is a schematic view of a motor vehicle whose engine is carried by at least one hydraulic vibration-damping support.
Figure 2:
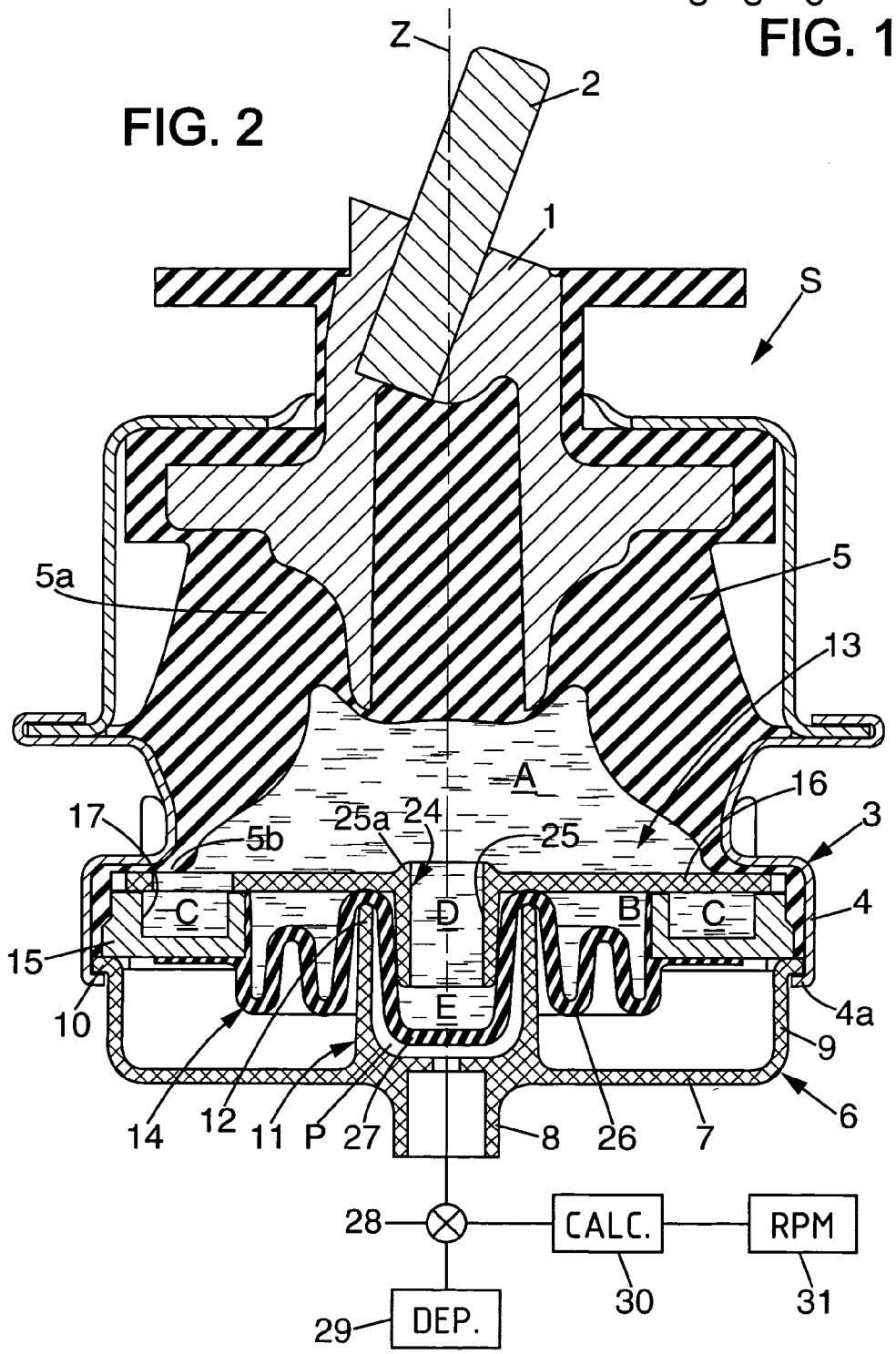
FIG. 2 is a vertical section view through a first embodiment of a vibration-damping support of the invention for the vehicle of FIG. 1, in an operating state corresponding to the engine idling.

FIG. 1 shows a motor vehicle V whose body C supports an engine M by means of at least one hydraulic vibration-damping support S such as, for example, the support shown in FIG. 2 for a first embodiment of the invention.

The vibration-damping support S comprises:
- a first rigid strength member 1 in the form of a metal base which is secured to a pin 2 that extends upwards along a vertical central axis Z and that serves to be fastened, for example, to the engine M of the vehicle;
- a second rigid strength member 3, e.g. made of metal, that serves to be fastened, for example, to the body C of the vehicle, and that has, in particular, a ring 4; and
- an elastomer body 5 capable of withstanding, in particular, the static forces due to the weight of the engine M, it being possible for said elastomer body to be bell-shaped, for example, the bell shape extending between a top 5a overmolded on and bonded to the base 1, and an annular base 5b overmolded on and bonded to the ring 4.

In addition, the support S further comprises a bottom protective cover 6 which is, for example, made of metal or optionally of a plastics material.

In the example shown in FIG. 2, the cover 6 has a bottom 7 that is substantially horizontal, that can have a pneumatic connection piece 8, e.g. situated in its center, and that is extended upwards by a side wall 9 terminated by an optionally-annular outwardly-extending flange 10.

In correspondence with the pneumatic connection piece 8, the cover 6 forms a cup 11 which has an annular side wall 12 extending upwards from the bottom 7 and internally defining a pneumatic chamber P communicating with the above-mentioned pneumatic connection piece 8.

In addition, the second strength member 3 is secured to a rigid partition 13 which extends perpendicularly to the axis Z and which is clamped between the base 5b of elastomer body 5 and the flange 10 on the cover 6.

This rigid partition co-operates with the elastomer body 5 to define a hydraulic working chamber A filled with liquid. In addition, on its side opposite from the working chamber A, the rigid partition 13 co-operates with a fine, flexible wall 14 which can, in particular, be made of elastomer, to define an annular hydraulic compensation chamber B and an additional hydraulic chamber E situated in the center of the compensation chamber B.

The periphery of the flexible wall 14 is secured to the rigid partition 13, e.g. by being overmolded on and bonded to said rigid partition, and/or by being nipped between the rigid partition 13 and the top annular edge of the wall 9 of the cup.

The compensation chamber B is filled with liquid and communicates with the working chamber A via a first constricted passageway C which is itself filled with liquid, which is defined, for example, inside the partition 13, and which is dimensioned to have a resonant frequency of less than 20 Hz, for example. The additional hydraulic chamber E is also filled with liquid and communicates with the working chamber A via a second constricted passageway D itself filled with liquid, which passageway can, for example, be a cylindrical passageway extending along the vertical axis Z, and can be dimensioned to have a resonant frequency lying in the range 20 Hz to 80 Hz, for example.

In the example shown in FIG. 2, the rigid partition 13 comprises:
- a recessed annular shell 15 made of a light alloy or of a plastics material, for example; and
- a thin plane plate 16 made of a plastics material or optionally of metal, of thickness lying, for example, in the range 4 millimeters (mm) to 6 mm, which plate covers the shell 15 towards the working chamber A and can be fastened to said shell by being crimped, by being pressed by the base 5b of the elastomer body, or by some other means.

In this example, at its outside periphery, the annular shell 15 is provided with a groove 17 that is open upwards and that defines the first constricted passageway C. The first constricted passageway C communicates firstly with the working chamber A via a recess 18 provided in the plate 16, and secondly with the compensation chamber B via a recess provided in the partition 15 (not shown).

At its center, the plate 16 defines a nozzle 24 advantageously extending along the central axis Z and that defines the above-mentioned second constricted passageway D. The nozzle 24 is formed inside a tube 25 that is secured to the plate 16 or is formed integrally therewith. The tube 25 extends axially inside the cup 11 while being surrounded by the central portion 27 of the flexible wall 14, which flexible wall is pressed locally into leaktight contact with the bottom face of the plate 16 around the tube 25. The flexible wall 14 thus forms first and second flexible pouches 26, 27 constituted respectively by the peripheral portion 26 of the flexible wall, situated radially outside the cup 11, and by the central portion 27 of the flexible wall 14, situated radially inside said cup 11.

The tube 25 can also optionally be extended inwards from the working chamber A via a collar 25a. The collar 25a can advantageously have an axial length that is considerably shorter than the total axial length of the tube 25, e.g. less than one tenth of the total axial length of the tube 25, so that the second constricted passageway D is mainly situated inside the cup 11.

These provisions enable the vibration-damping support S to be very compact along the central axis Z and to be small in weight, without degrading the vibration-damping performance of the support.

Finally, the pneumatic connection piece 8 communicates with a three-port valve 28 that is adapted to put the pneumatic chamber P either into communication with a suction source 29 (DEP.) provided in the vehicle (vacuum pump, optionally the vacuum circuit used for assisting braking of the vehicle, or some other source), or else into communication with the atmosphere.

The three-port valve 28 can advantageously be constituted by a solenoid valve controlled by an electronic control circuit 30 (CALC.) such as, for example, the on-board computer of the vehicle, itself connected to a sensor 31 (RPM) indicating the speed of the engine.

Thus, when the engine of the vehicle is idling, i.e. when the sensor 31 indicates a speed lower than a predetermined limit corresponding, for example, to a vibration frequency lying in the range 20 Hz to 100 Hz, the control circuit 30 actuates the valve 28 so that it puts the pneumatic chamber P into communication with the atmosphere, as shown in FIG. 2.

In this mode of operation, the vibration from the engine M is transmitted to the working chamber A via the elastomer body 5, thereby causing fluctuations in the volume of said working chamber that are absorbed by deformation in the additional hydraulic chamber E: in view of the resonant frequency of the second constricted passageway D, which frequency corresponds substantially to the frequency of the vibration emitted by the engine when it is idling, said constricted passageway D is then the subject of resonance phenomena that make it possible to filter out effectively the vibration from the engine.

At this engine speed, it is also possible to control the valve 28 so that it subjects the pneumatic chamber alternately to suction and to atmospheric pressure, so as to generate counter-vibration suitable for reducing the effect of the vibration from the motor.

Conversely, in predetermined conditions corresponding, for example, to the vehicle traveling, i.e. in particular at an engine speed grater than said predetermined limit, the control circuit 30 preferably actuates the valve 28 so that the pneumatic chamber P communicates continuously with the suction source 29 so that the flexible pouch 27 is then held pressed against the inside surface of the cup 11.

In this mode of operation, it is as if the additional hydraulic chamber E no longer existed, and the vibration-damping support operates conventionally by damping vibration of low frequency (e.g. less than 20 Hz) and of large amplitude (e.g. greater than 1 mm) by liquid transfer between the compensation chambers A and B through the constricted passageway C.

What is claimed is:

1. A hydraulic vibration-damping support designed to be interposed for vibration-damping purposes between first and second rigid elements, said vibration-damping support comprising:
    first and second strength members serving to be fastened to the two rigid elements;
    a rigid partition comprising at least one plate;
    an elastomer body which connects the two strength members together and which co-operates with the partition to define a working chamber filled with liquid;
    first and second flexible pouches which co-operate with said rigid partition to define respectively a compensation chamber and an additional hydraulic chamber, which chambers are adjacent and liquid-filled, the compensation chamber being connected to the working chamber via a first constricted passageway filled with liquid and that has a first resonant frequency of less than 20 Hz, and the additional hydraulic chamber being connected to the working chamber via a second constricted passageway that has a second resonant frequency lying in the range 20 Hz to 80 Hz; and
    a cup co-operating with said partition to define a pneumatic chamber formed around the second pouch;
    wherein said plate is secured to a tube that extends inside the second flexible pouch and defines the second constricted passageway, said tube being surrounded radially by the side wall of the cup, a portion of the second pouch lying between the tube and said side wall.

2. A vibration-damping support according to claim 1, in which the partition further comprises an annular shell that has a groove defining the first constricted passageway and closed by said plate towards the working chamber.

3. A vibration-damping support according to claim 2, in which the compensation chamber is disposed, at least in part, radially between the cup and the annular shell.

4. A vibration-damping support according to claim 1, in which the first and second flexible pouches are formed in the same flexible wall, the cup having a side wall that bears against the flexible wall and that locally presses said flexible wall against the rigid partition, thereby separating the compensation chamber from the additional hydraulic chamber.

5. A vibration-damping support according to claim 4, in which the cup presses the flexible wall against the plate around the tube.

6. A vibration-damping support according to claim 1, in which the tube is formed integrally with the plate.

7. A vibration-damping support according to claim 6, in which the tube and the plate are made of plastics material.

8. A hydraulic vibration-damping support according to claim 1, in which the tube is extended inside the working chamber.

9. A vibration-damping support according to claim 8, in which the tube is extended inside the working chamber by forming a collar in said working chamber, said collar having an axial length that is less than one tenth of the total axial length of the tube.

10. A vibration-damping support according to claim 1, in which the second constricted passageway is mainly disposed inside the cup.

11. A vibration-damping support according to claim 1, in which said plate is plane.

12. A vibration-damping support according to claim 1, in which the cup is formed integrally with a rigid cover that covers said flexible wall.

13. A vibration-damping support according to claim 1, in which the second constricted passageway extends substantially parallel to a central axis that is perpendicular to the plate.

14. A vibration-damping support according to claim 1, in which the pneumatic chamber is connected to the outside via a vent passageway.

* * * * *